United States Patent [19]
Yoshida et al.

[11] Patent Number: 5,251,075
[45] Date of Patent: Oct. 5, 1993

[54] CUE SIGNAL DETECTING APPARATUS

[75] Inventors: Yoshiyuki Yoshida; Seiichi Sakuma, both of Osaka, Japan

[73] Assignee: Sanyo Electric Co., Ltd., Japan

[21] Appl. No.: 582,834

[22] PCT Filed: Feb. 6, 1990

[86] PCT No.: PCT/JP90/00147
§ 371 Date: Oct. 4, 1990
§ 102(e) Date: Oct. 4, 1990

[87] PCT Pub. No.: WO90/09662
PCT Pub. Date: Aug. 23, 1990

[30] Foreign Application Priority Data
Feb. 8, 1989 [JP] Japan .................................. 1-30621
Dec. 18, 1989 [JP] Japan .................................. 1-327641

[51] Int. Cl.[5] .......................... G11B 5/02; G11B 27/02
[52] U.S. Cl. ..................................... 360/18; 360/14.2
[58] Field of Search ................ 360/18, 13, 14.1, 14.2, 360/14.3, 10.1, 27

[56] References Cited
U.S. PATENT DOCUMENTS 4,384,308  5/1983  Yanagida ............................ 360/27
4,466,029  8/1984  Tanaka ............................. 360/14.2
4,691,250  9/1987  Ookawa ............................ 360/14.1

FOREIGN PATENT DOCUMENTS
61-8773  1/1986  Japan .

Primary Examiner—Donald T. Hajec
Assistant Examiner—Won Tae C. Kim
Attorney, Agent, or Firm—Peter L. Michaelson

[57] ABSTRACT

The present invention relates to a magnetic recording-/reproduction device (such as VTRs and DATs). A cue signal becomes a mark of its position for automatic operation and automatic editing and is to be recorded in advance with the contents of a program. The frequency of the cue signal is selected within the audio signal band. On an auxiliary audio track (24) in a magnetic tape (21), an audio signal as well as a cue signal is recorded in time division manner. Determination is made of a correct cue signal by providing a mute period before the cue signal recording region and detecting a cue signal by a filter after the detection of a mute period. The frequency ratio of the cue signal to control signal (CTL) is determined by a counter (6) with a CPU (7) being used to identify a cue signal in response to the frequency ratio. By dividing the reproduced signal into blocks, the cue signal is detected from the cycle number distribution of the frequency. Through use of the invention, the efficiency of cue signal recording/reproduction can be improved and the circuitry used to precisely detect it can be simplified.

4 Claims, 11 Drawing Sheets

(a) CUE SIGNAL
(b) CTL
(c) COUNT OPERATION

FIG. 7

33.3 msec (a)
(b)

CUE SIGNAL DETECTING APPARATUS

TECHNICAL FIELD

The present invention relates to a method of recording a cue signal and a detecting apparatus thereof, and more particularly, to a method of efficiently recording a cue signal on a magnetic tape and an apparatus for correctly detecting the cue signal recorded on the magnetic tape.

BACKGROUND ART

In magnetic recording/reproduction devices (such as video tape recorders (VTRs) and digital audio tape recorders DATs) for business use and some for private use, various controls were carried out by recording a cue signal on a magnetic tape and detecting that cue signal at reproduction. This cue signal becomes a mark of its position to be recorded at the starting point or ending point of a program, or at a splice of an edition, or at a starting point or ending point of repeated reproduction, for example. By using such a cue signal, it is possible to control the automatic operation of multiple magnetic recording/reproduction devices, automatic editing, automatic repeated reproduction and the like.

In Japanese Patent Laying-Open No. 61-8773 (G11B20/10), a structure is disclosed where the address code and cue signals are recorded/reproduced by frequency division multiplexing using the same track to improve the usage efficiency of the tape in the control operation of a magnetic recording/reproduction device, for example.

In the conventional art disclosed in the above mentioned laid-open application, envelope detecting circuits and pass filters for each signal are necessary to separate the address code and the cue signal during reproduction, leading to a problem that the structure of the magnetic recording/reproduction device becomes complicated and costly. Furthermore, there was a problem that it was difficult to efficiently record/reproduce both address code and cue signal due to the fact that two signals or information having significantly different frequencies are recorded/reproduced by the same record/reproduction system in the above mentioned conventional art. When the record and reproduction characteristics of the above mentioned record/reproduction system are conformed to either the address code or the cue signal, the efficiency of record and reproduction of the other signal is deteriorated. It was also difficult to completely separate the address code and the cue signal at the time of reproduction because the address code and the cue signal were recorded by frequency division multiplexing in the above mentioned conventional art. This resulted in the problem that either of the separated address code or the cue signal is mixed with the other signal, leading to more noise.

DISCLOSURE OF THE INVENTION

Accordingly, an object of the present invention is to provide a method of recording a cue signal in which a cue signal can be efficiently recorded/reproduced without causing degradation of S/N ratio, and the structure of the cue signal detecting circuit is simplified.

Another object of the present invention is to provide a cue signal detecting apparatus that can correctly detect the cue signal recorded by the inventive recording method at the time of reproduction.

The method of recording a cue signal in accordance with the present invention carries out time division multiplexing of a cue signal having a frequency in the audio signal band with an audio signal, to record the same on an identical track of a magnetic tape. In accordance with such a method of recording, the cue signal and the audio signal recorded on the same track have their frequencies in close proximity so that the recording/reproduction efficiency of these signals is not deteriorated even when the recording/reproduction of these signals are carried out using the same record/reproduction system. Because time division multiplexing is employed in the recording method of the present invention, the cue signal and the audio signal can be completely separated at the time of reproduction without degradation in S/N ratio caused by signal mixture. The application of time division multiplexing in the recording method of the present invention makes it possible to easily separate the cue signal and the audio signal without using envelope detecting circuits and pass filters during reproduction. As a result, the structure of the magnetic recording/reproduction device is simplified and becomes economical.

The cue signal detecting apparatus, in accordance with the present invention, is based on the condition that the audio signal and the cue signal having a frequency in the audio signal band are recorded on the same track by time division multiplexing in a magnetic tape, from which the signals are reproduced, and the cue signal detected. The following features are also included.

A first cue signal detecting apparatus, in accordance with the present invention, comprises filtering means for extracting a cue signal from the reproduced signal of the track where the cue signal is recorded. In accordance with such a structure, a cue signal can be detected by a very simple structure.

A second cue signal detecting apparatus, in accordance with the present invention, comprises proportional frequency signal reproducing means and cue signal detecting means. The proportional frequency signal reproducing means reproduces a signal having a frequency proportional to the speed of the magnetic tape from a track differing from that where the cue signal is recorded. The cue signal detecting means detects that a cue signal is reproduced by comparing the frequencies of the reproduced signal from the track where the cue signal is recorded and the output signal of the proportional frequency signal reproducing means. In accordance with such a structure, a cue signal can be detected without error even if there are irregularities in the speed of the magnetic tape.

A third cue signal detecting apparatus, in accordance with the present invention, comprises cue signal detecting means for detecting a cue signal by dividing the reproduced signals from the track where the cue signal is recorded into blocks of a predetermined time unit and detecting the period distribution of the frequency of the reproduced signal in each block. In accordance with such a structure, a cue signal can be detected without error even if the waveform of the audio signal recorded on the same track or the noise is similar to that of the cue signal.

BRIEF DESCRIPTION OF THE DRAWINGS

FIG. 6a–6c is a timing chart for explaining the operation of the embodiment of FIG. 4.

FIG. 7a–7b is a waveform diagram for explaining the problems in the embodiment of FIG. 4.

FIG. 9a–9c is a waveform diagram for explaining the operation of the embodiment of FIG. 8.

BEST MODE FOR CARRYING OUT THE INVENTION

The embodiments of the present invention will be explained hereinafter with reference to the drawings. The described embodiments show the example where the present invention is applied to a video tape recorder VTR. However, the present invention is applicable to any magnetic recording/reproduction device using magnetic tape, and can also be applied to digital audio tape recorders (DATs) and the like. In such other applications, the following embodiments can be substantially used without modifying the structure thereof.

Figure 1:
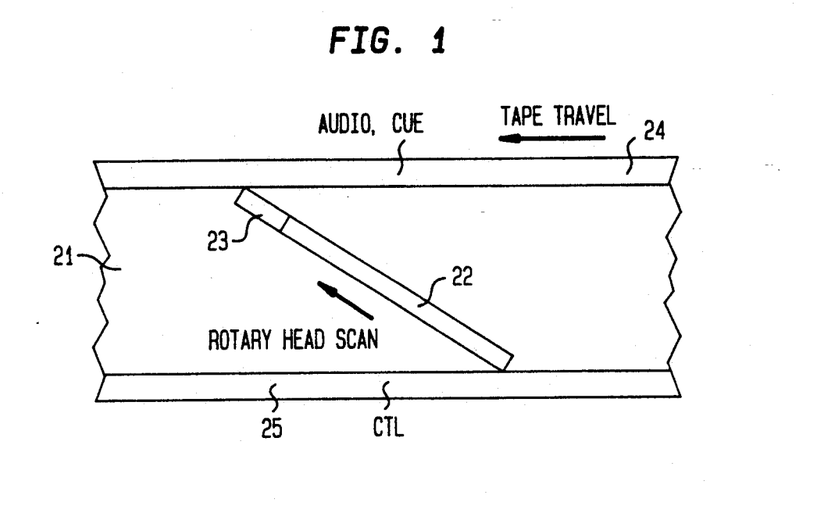
FIGS. 1 and 2 are respectively, a track pattern diagram and a record format diagram for explaining the method of recording a cue signal in accordance with one embodiment of the present invention.
Figure 2:
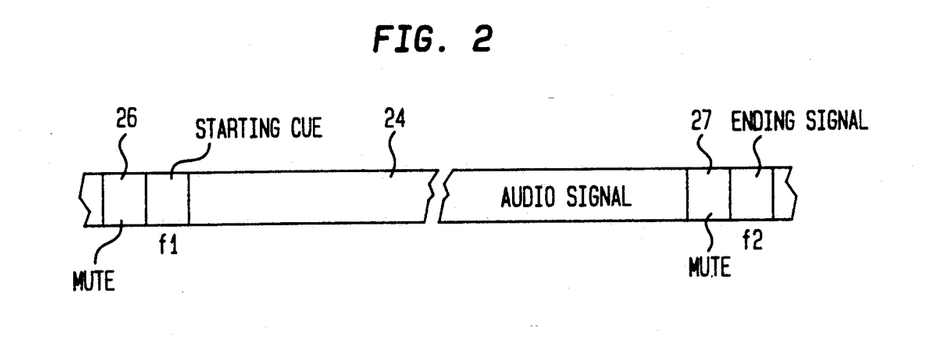

Referring to FIG. 1 and 2, the method of recording a cue signal in accordance with an embodiment of the present invention is described.

In FIG. 1, a video track 22 and a pulse code modulation (PCM) audio track 23 inclining obliquely with respect to the longitudinal direction of a magnetic tape 21 are formed thereon by a rotary magnetic head. At one end of the magnetic tape 21 in the width direction, an auxiliary audio track 24 is formed along the longitudinal direction thereof. On the other end in the width direction, a control track 25 is formed along the longitudinal direction thereof. Video signals are recorded on video track 22. Audio signals corresponding to the video contents of video track 22 are recorded on the PCM audio track. A control signal CTL having a constant frequency in synchronism with the speed of the magnetic tape 21 is recorded on control track 25. This control signal CTL is used for tracking control at the time of reproduction. Audio signals and cue signals are recorded on auxiliary audio track 24. The audio signals recorded on auxiliary audio track 24 are used as auxiliaries to the audio signals recorded on PCM audio track 23. For example, the audio signal recorded on auxiliary audio track 24 has a content identical to that of the audio signal recorded on PCM audio track 23, to be used for monitoring whether or not the audio signal is correctly recorded on PCM audio track 23. Because the audio signal recorded on auxiliary audio track 24 is only a signal for monitoring, there is no problem even if some information is missing.

In auxiliary audio track 24, a cue signal having a frequency in the audio signal band is recorded in time division manner with the audio signal. In other words, as shown in FIG. 2, a starting cue signal having a frequency $f_1$ (a sine wave of 1 Khz, for example) is recorded for approximately 1 second at the position of approximately 10 seconds before the start of the program after a mute period 26 of 1 second. At the position of approximately 10 seconds before the end of the program, an ending cue signal of a frequency of $F_2$ (a sine wave of 1.6 kHz, for example) is recorded for approximately 1 second after a mute period 27 of 1 second.

From the foregoing, it is seen that the cue signal recorded in a time division manner with the audio signal has a frequency in a band identical to that of the audio signal. Therefore, even if the record/reproduction characteristic of the record/reproduction system of auxiliary audio track 24 is selected so as to conform to the original record/reproduction of the audio signal, it is possible to efficiently record and reproduce the cue signal without degrading S/N ratio of the cue signal. The cue signal and the audio signal recorded by time division multiplexing can be easily separated during reproduction, and complete separation can be achieved. This eliminates the mixture of the separated cue signal and the audio signal with each other, with improvement in S/N ratio.

To record the aforementioned cue signal, a signal source generating the cue signal is provided. The cue signal output from this signal source is applied to a fixed magnetic head (abutted to auxiliary audio track 24) for auxiliary audio recording/reproduction. To form mute periods 26 and 27, a constant bias signal for record/erase may be applied to the above mentioned fixed head. To erase a recorded cue signal, a completely unrelated frequency signal may be recorded in superimposition, or the aforementioned constant bias signal may be applied to the fixed head to erase the recorded contents of auxiliary audio track 24.

Although a starting cue signal and an ending cue signal are recorded in auxiliary audio track 24 as cue signals in the embodiment of FIG. 2, other cue signals (for example, end notifying signal) may be recorded. An end notifying signal is a sine wave signal of 2.4 kHz, for example, recorded for one second after a mute period of one second, and approximately 30 seconds before the end of the program, for example.

Several embodiments of the cue signal detecting apparatus for identifying a cue signal recorded in the above mentioned manner from the reproduced signals of auxiliary audio track 24 will be described hereinafter.

Figure 3:
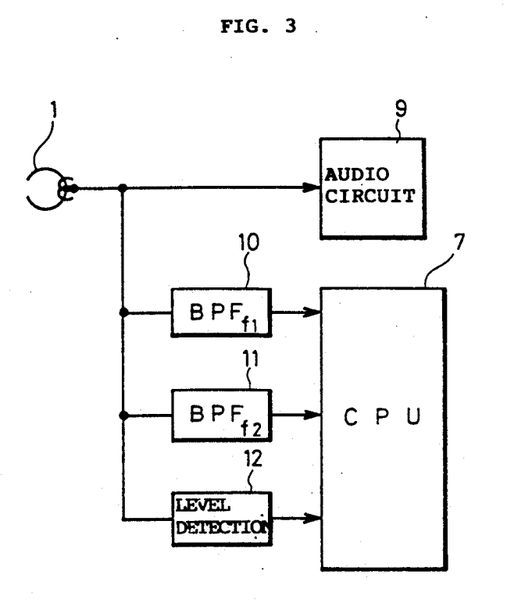
FIG. 3 is a block diagram showing the structure of a cue signal detecting apparatus in accordance with the first embodiment of the present invention.

FIG. 3 is a block diagram showing an example of a cue signal detecting apparatus in accordance with a first embodiment of the present invention. The embodiment of FIG. 3 shows the most simple cue signal detecting apparatus. In the figure, a fixed magnetic head 1 is a magnetic head for recording and reproducing signals associated with auxiliary audio track 24. The reproduced signal of fixed magnetic head 1 is applied to an audio circuit 9, band pass filters 10, 11, and a level detecting circuit 12. The audio circuit 9 processes the reproduced signal of fixed magnetic head 1 to generate the audio signal for monitoring. The pass band of band pass filter 10 is selected so as to pass only a starting cue signal from the reproduced signals of fixed magnetic head 1, whereas the pass band of band pass filter 11 is selected so as to pass only the ending cue signal of the reproduced signal of fixed magnetic head 1. The level detecting circuit 12 detects the level of the reproduced signal of fixed magnetic head 1. The outputs of band pass filters 10, 11 and level detecting circuit 12 are provided to a CPU 7. For the most simplest manner, CPU 7 determines that the starting cue signal is reproduced when the output of band pass filter 10 is activated, and that the ending cue signal is reproduced when the output of band pass filter 11 is activated. In the embodiment of FIG. 3, CPU 7 will make determination of the cue signals when a predetermined frequency signal is detected for a predetermined time by band pass filters 10 or 11, after the level of the reproduced signal detected by level detecting circuit 12 is low for a predetermined period. This reduces erroneous operation at the time of cue signal detection.

However, the embodiment of FIG. 3 can not detect the cue signal correctly if the speed of magnetic tape 21 changes, because the frequency of the cue signal included in the reproduced signal also changes with tape speed.

Figure 4:
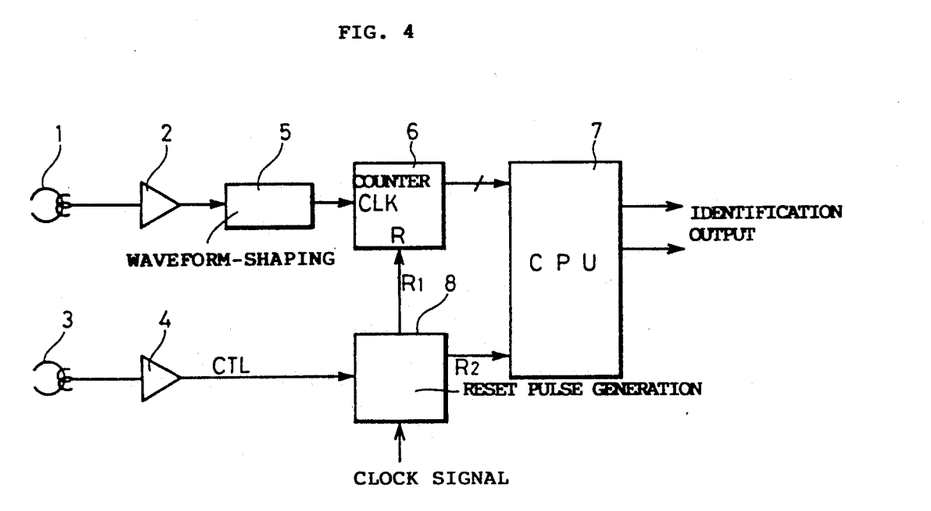
FIG. 4 is a block diagram showing the structure of a cue signal detecting apparatus in accordance with a second embodiment of the present invention.

To solve the above mentioned problem, a cue signal detecting apparatus according to a second embodiment of the present invention shown in FIG. 4 is devised. The embodiment of FIG. 4 has a structure that identifies the cue signal by comparing the frequencies of the signal reproduced from auxiliary audio track 24 and control signal CTL reproduced from control track 25.

In FIG. 4, the signal read out from auxiliary audio track 24 by fixed magnetic head 1 is amplified by an amplifier 2, followed by conversion into a rectangular wave by a waveform-shaping circuit 5. This rectangular wave is counted by a counter 6. A reset pulse $R_1$ from a reset pulse generating circuit 8 is applied to counter 6. Counter 6 is responsive to this reset pulse $R_1$ to reset the counting operation.

Reset pulse generating circuit 8 generates reset pulses $R_1$, $R_2$ according to the control signal CTL reproduced by fixed magnetic head 3 and amplified by amplifier 4, and the clock signal of CPU 7. These reset pulses $R_1$, $R_2$ are signals in synchronism with control signal CTL, with frequencies identical to that of control signal CTL, or may be a frequency division of control signal CTL. Reset pulse $R_2$ is a signal earlier in time than reset pulse $R_1$ (a signal advancing by one to several clock pulses, for example). This is because it is necessary to fetch the output of counter 6 to CPU 7, before counter 6 is reset.

Figure 5:
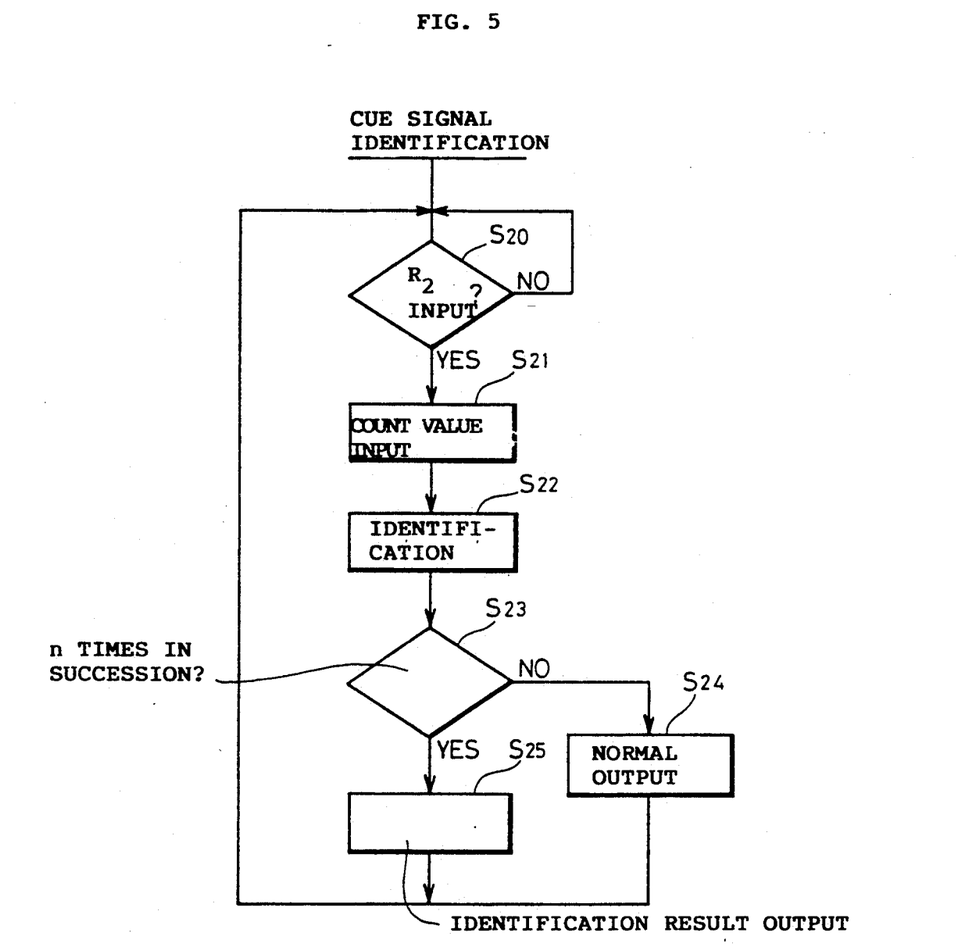
FIG. 5 is a flow chart for explaining the operation of the embodiment of FIG. 4.

The main operation of cue signal identification is carried out mainly by CPU 7. The operation of CPU 7 is schematically shown in FIG. 5. Referring to FIG. 5, the identification operation of the cue signal in accordance with the embodiment of FIG. 4 is described hereinafter.

When a reset signal $R_2$ is applied to CPU 7, the count value of counter 6 (a digital signal of n bits) is read into CPU 7 (steps S20, S21). Then, CPU 7 compares the read count value of counter 6 with a reference value provided internally in advance to identify the cue signal (step S22). In other words, because the control signal and the starting cue signal are both a signal with a constant frequency, the ratio of the frequency of the control signal to frequency $f_1$ of the starting cue signal is known in advance. Even if the speed of magnetic tape 21 changes, the reproduced control signal and the frequency of the reproduced starting cue signal has also changed in response to the change in the speed of the tape. Accordingly, the aforementioned frequency ratio m is constant. The count value of counter 6 indicates the ratio of the frequency of control signal CTL reproduced by fixed magnetic head 3 to the frequency of the signal reproduced by fixed magnetic head 1. Therefore, CPU 7 can determine that a starting cue signal is included in the reproduced signal of fixed magnetic head 1 when the count value of counter 6 coincides with the above mentioned frequency ratio m. However, if the CPU determines that there is a starting cue signal only when the count value of counter 6 exactly coincides with the aforementioned frequency ratio m, there is a possibility of not detecting the starting cue signal because of a negligible mixture of a small amount of noise with the reproduced signal or a slight change in frequency or the like. In practical use, a lower limit value $L_1$ and an upper limit value $L_2$ are set so that $L_1 < m < L_2$, where determination is made that a starting cue signal is reproduced when $L_1 <$ count value $< L_2$. The identification procedure of an ending cue signal is carried out similarly in the aforementioned manner.

At step S23, a check is performed as to whether the identification of the same cue signal is carried out n times in succession. If control signal CTL is recorded in 30 Hz, identical results are obtained 30 times because the cue signal is recorded for a period of 1 second. In practice, n is set to 10–20 times.

The result of a cue signal identification is provided for the first time (step S25) when determination is made that the identification of the same cue signal occurs n times in succession at step S23. Alternatively, a corresponding control of VTR by CPU 7 is carried out. If the identification of the same cue signal is not carried out n times in succession, the output will indicate a state where a cue signal is not identified (step S24). Operation is returned to step S20 after steps S25 or S24 to repeat the above mentioned serial operation.

Figure 6:
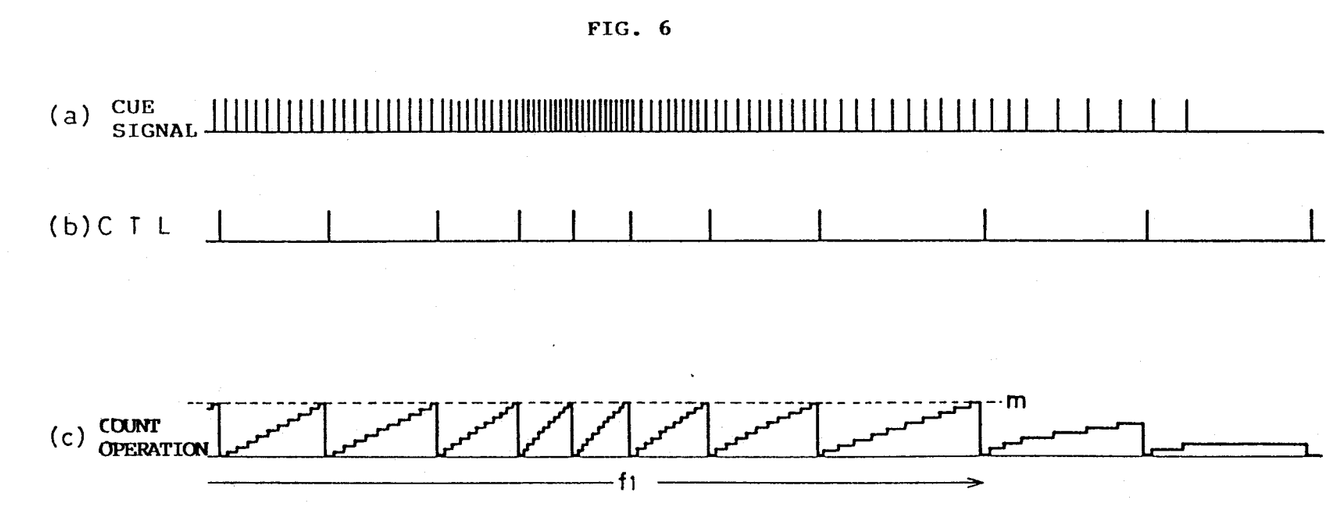

In the above mentioned embodiment of FIG. 4, the frequency ratio of the reproduced signals of fixed magnetic head 1 and head 3 are sought using a counter, from which determination of a cue signal is made in response to this frequency ratio. Therefore, as shown in FIG. 6, the counter value (frequency ratio) is identical even when the speed of the magnetic tape 21 is changed, (or when the speed differs from that of normal reproduction, i.e., fast forward, or rewind), to allow correct identification of a cue signal. Although the reproduced control signal CTL is used as the object of comparison in frequency in the embodiment of FIG. 4, other signals may be used instead of control signal CTL as long as it is a signal having a frequency proportional to the speed of magnetic tape 21. In the case where a time code track is formed on magnetic tape 21, having the FG (rotate detection) signal of the capstan motor which drives magnetic tape 21 recorded by the fixed magnetic head, the clock signal from this time code track can be used as the object of frequency comparison. Then, in response to the ratio and high/low relation of the frequency, the structure of the embodiment of FIG. 4 is modified.

Figure 7:
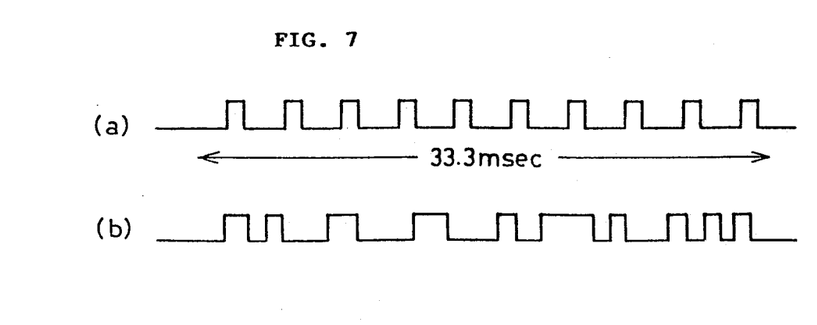

There is a possibility that erroneous determination is made sometimes because the number of the pulses are simply counted in the embodiment of FIG. 4. For example, even if the number of pulses during a predetermined period (33.3 msec) is equal regarding the reproduced signal of fixed magnetic head 1, the frequency may be changed at random, as shown in FIG. 7. In this case, there is a possibility that CPU 7 will erroneously determine that signals that are not the cue signal (a normal audio signal, for example) is a cue signal.

Figure 8:
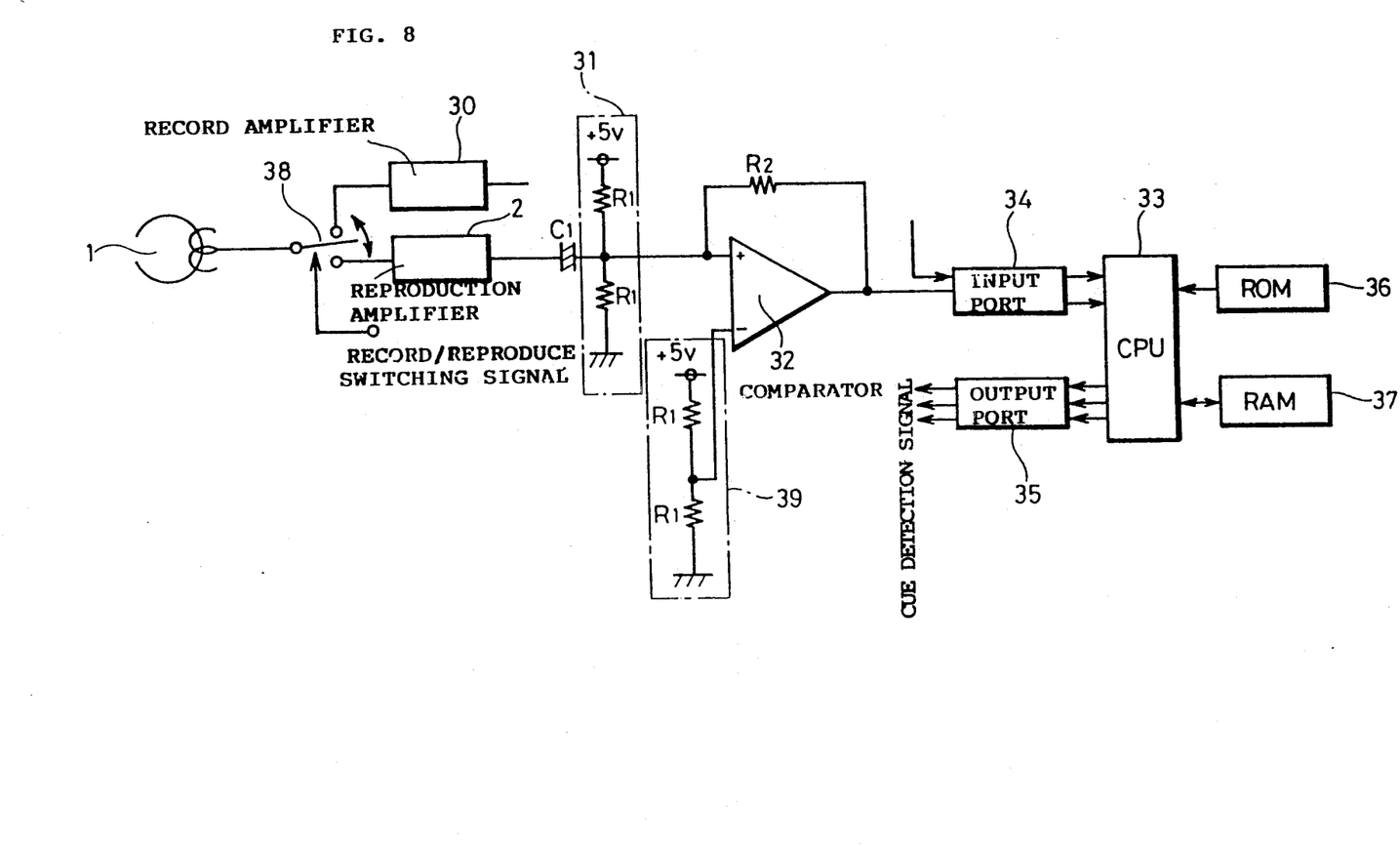
FIG. 8 is a block diagram showing the structure of a cue signal detecting apparatus in accordance with the third embodiment of the present invention.

An embodiment that can solve the above mentioned problem is described hereinafter. FIG. 8 is a block diagram showing a structure of a cue signal detecting apparatus in accordance with the third embodiment at the present invention. In the embodiment of FIG. 8, the period of the reproduced audio signal is checked in details to make determination whether it is a cue signal or not.

Figure 9:
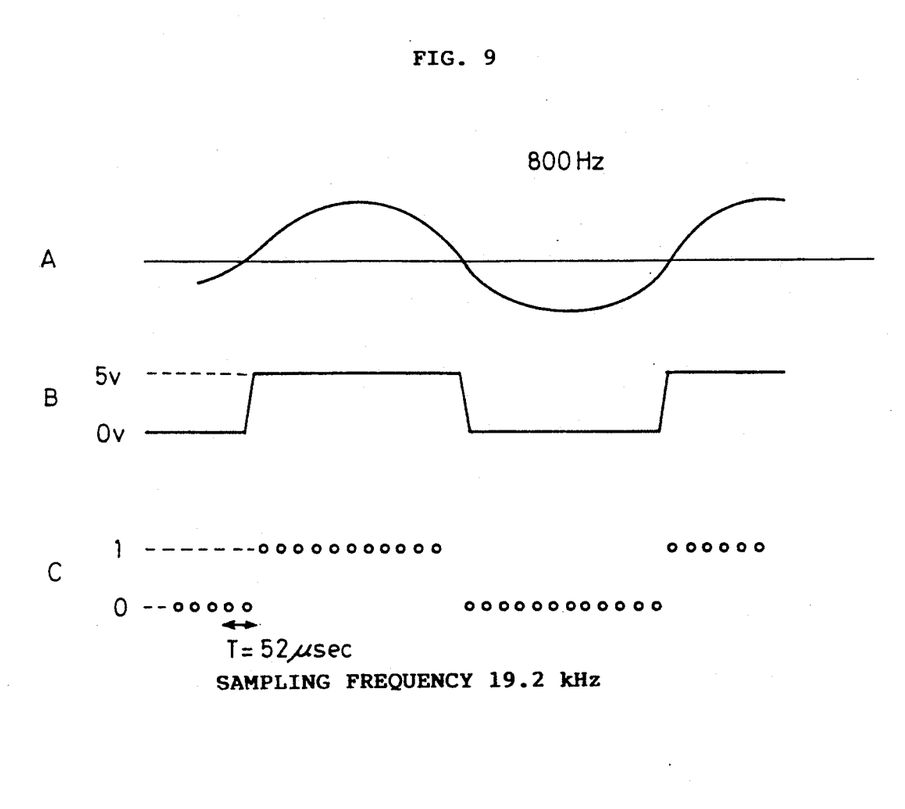

In FIG. 8, fixed magnetic head 1 is connected to a record amplifier 30 or a reproduction amplifier 2 by a change over switch 38. Change over switch 38 is switched by a record/reproduce switching signal. That is to say, change over switch 38 is switched to the record amplifier 30 side during record mode. Therefore, the record signal provided from record amplifier 30 is applied to fixed magnetic head 1. In response, fixed magnetic head 1 records the signal on auxiliary audio track 24 of FIG. 1. On the other hand, during reproduction mode, the change over switch 38 is switched to the reproduction amplifier 2 side. The reproduced signal read out from auxiliary audio track 24 by fixed magnetic head 1 is amplified by reproduction amplifier 2, to be provided to level shifting circuit 31 via a direct current blocking condenser C1. Because the reproduced signal is applied to level shifting circuit 31 after the direct current component is blocked by direct current blocking condenser C1, the average level of the reproduced signal provided from the level shifting circuit becomes 2.5 V. The output of level shifting circuit 31 is provided to the positive input terminal of comparator 32. The reference voltage (2.5 V) from a voltage dividing circuit 39 is supplied to the negative input end of comparator 32. The positive input end and the output terminal of comparator 32 are short-circuited therebetween by a resistor having a resistance value of $R_2$. As shown in FIG. 9, comparator 32 converts sine wave A at its positive input terminal into rectangular wave B at its output terminal. The sine wave is converted into a rectangular wave in a stable manner, due to the fact that comparator 32 comprises hysterisis characteristic. The output of comparator 32 is provided to a CPU 33 via an input port 34. A ROM 36 and a RAM 37 are connected to CPU 33. The operation program of CPU 33 is stored in ROM 36. RAM 37 stores various data. A microcomputer is implemented by CPU 33, ROM 36, and RAM 37. The substantial determination operation of the cue signal is carried out by this microcomputer. The output of the microcomputer, i.e., the output of CPU 33 is provided via an output port 35.

The frequencies of the respective cue signals are provided as in the following, for example.

Starting cue signal 800±60 Hz
Ending cue signal 1600±100 Hz
User cue 2400±100 Hz As indicated by waveform C, in FIG. 9, the frequency of the sampling signal for processing at CPU 33 is set to frequency 19.2 kHz which is in an integral multiple relation of the above described three cue signals. Accordingly, the sampling points in one period of a starting cue signal are 24, the sampling points in one period of an ending cue signal are 12, and the sampling points in one period of a user cue are 8.

Determination is made of a cue signal being reproduced if a signal of the above mentioned predetermined frequency continues for 0.6 seconds or more, after a mute period of 0.5 seconds or more. Therefore, by dividing the output of comparator 32 into blocks of 100 msec, for example, to determine whether each block is a mute state block or a cue signal block, determination may be made of a cue signal being reproduced when a cue signal block of identical type continues for 6 times or more in succession, after 5 or more mute blocks in succession. If the size of the divided block is too small, determination will become impossible due to effects such as noises, whereas identification between the mute period and the cue signal period will become difficult if the size is too large. In the embodiment of FIG. 8 comprising the aforementioned conditions, a block with the size of about 100 msec is appropriate.

Figure 10:
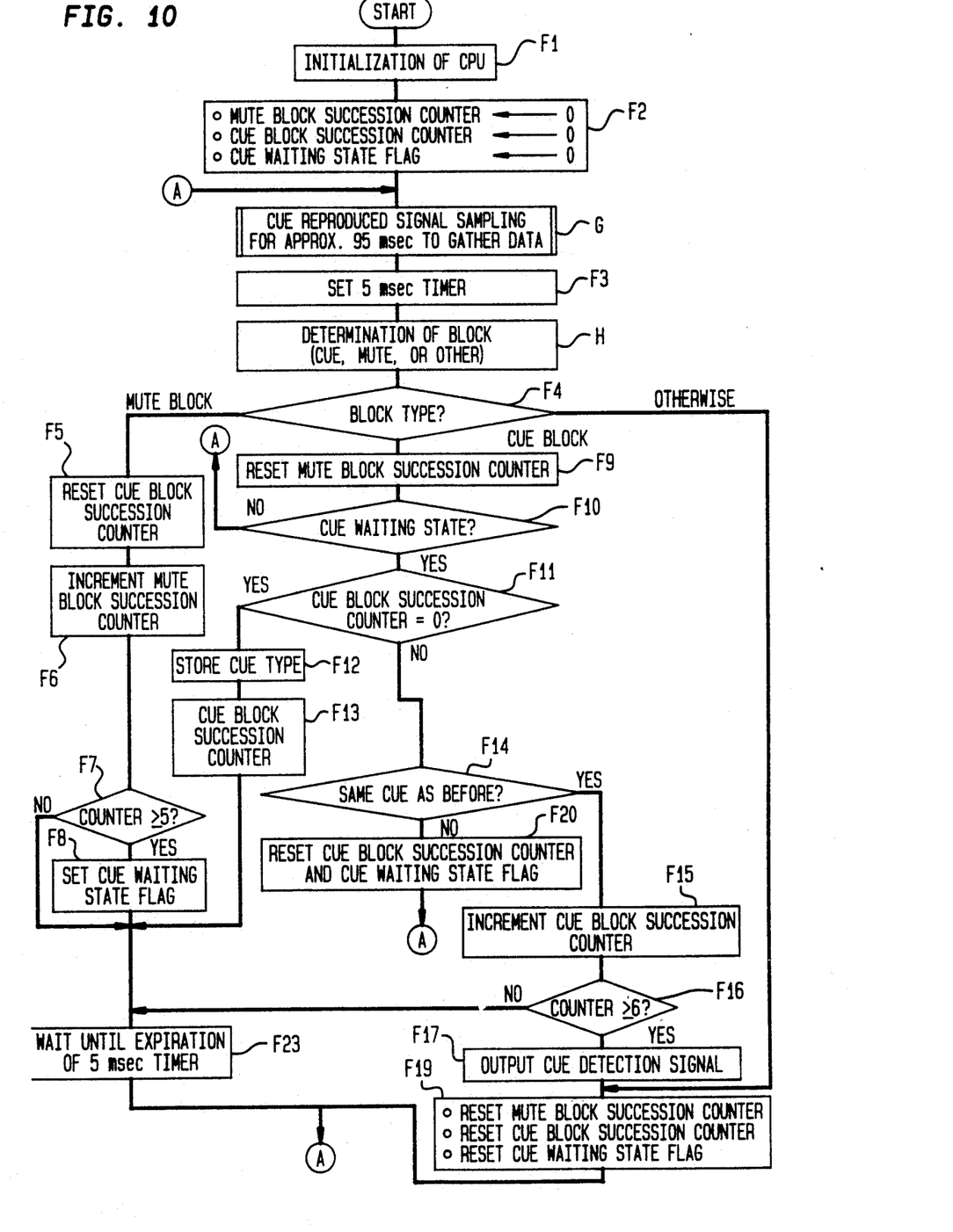
FIGS. 10–13 are flow charts for explaining the operation of the embodiment of FIG. 8.
Figure 11:
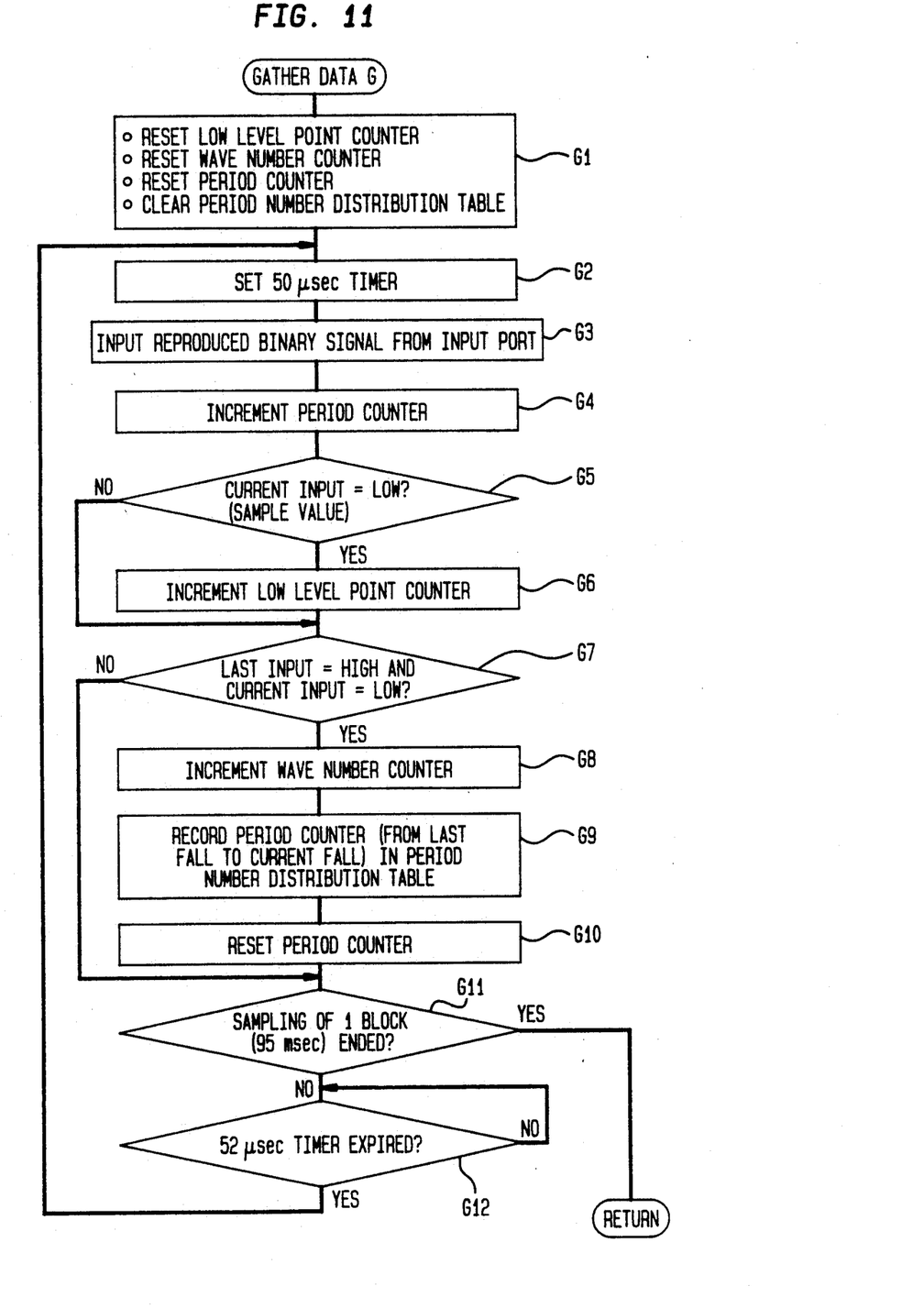
Figure 12:
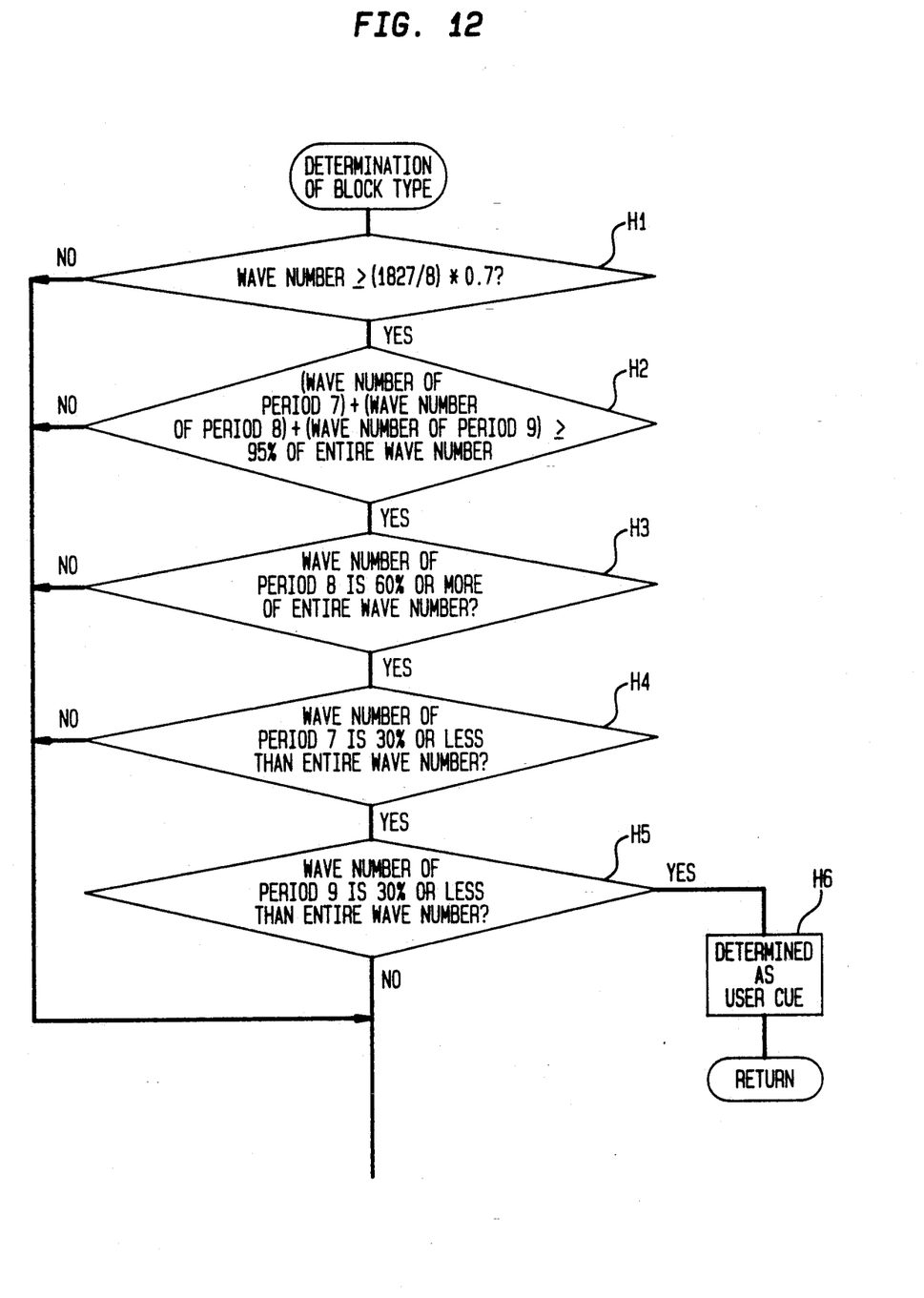
Figure 13:
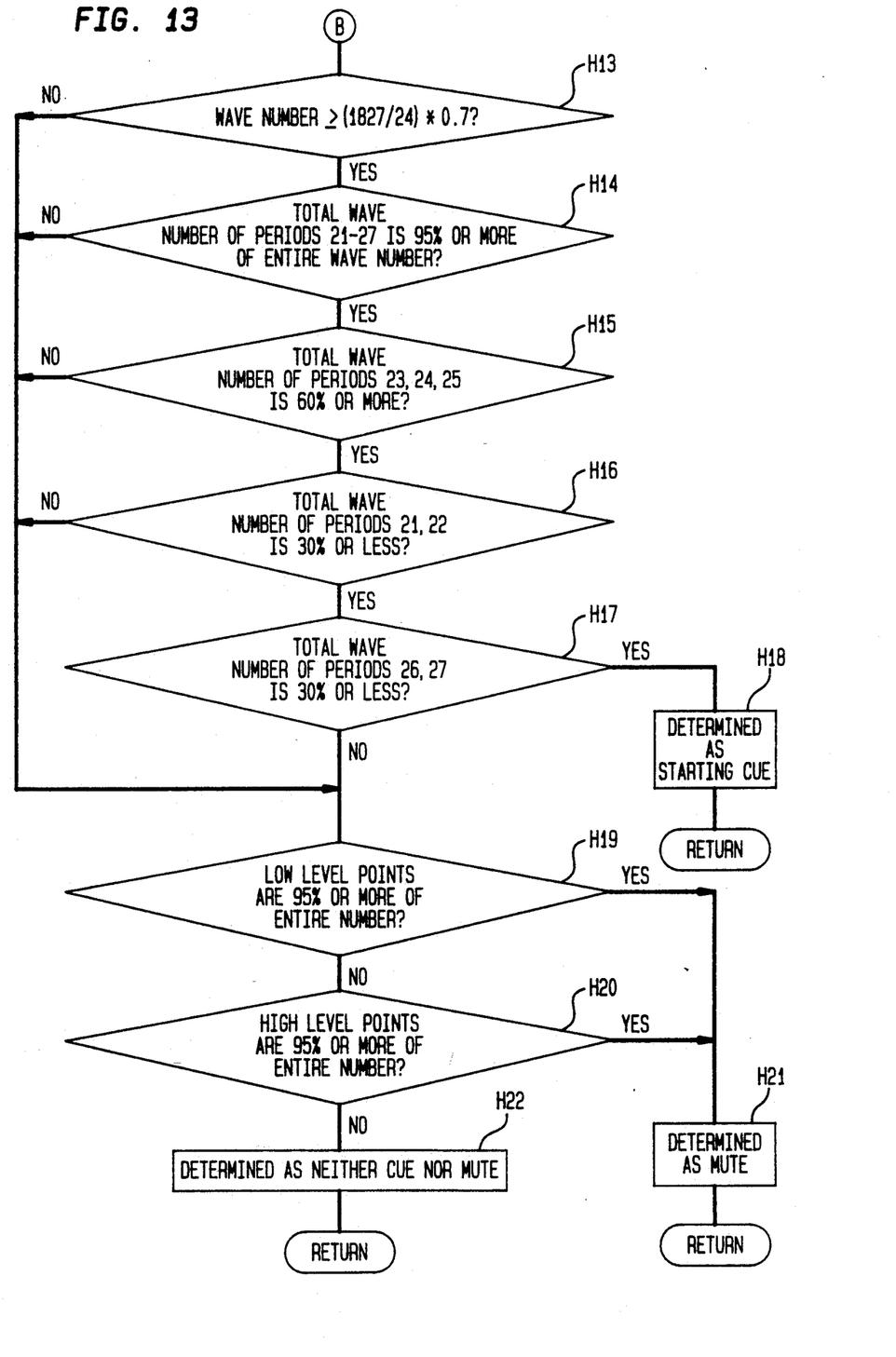

FIGS. 10 and 13 are flow charts for explaining the operation of mainly CPU 33 in the embodiment of FIG. 8. The flow chart of FIG. 11 shows the step G subroutine of the flow chart of FIG. 10 in detail, while FIGS. 12 and 13 show in detail the step H subroutine of the flow chart of FIG. 10. In reference with FIGS. 10-13, the operation of CPU 33 will be described hereinafter.

At the start of the operation, CPU 33 carries out the initialization (step F1). At step F2, the mute block succession counter, the cue block succession counter, and cue waiting state flag (these counters and flag are set within RAM 37) are each reset. At the next step of G, the output of comparator 32 is sampled for a period of approximately 95 msec, and the data is stored. At the next step F3, a timer of 5 msec (a soft timer comprised in CPU 33) is started. At the next step H, determination is made of the type of the current blocks according to the data obtained at step G. At step F4, the operation is branched in response to the determination result of step H. When determination is made of a mute block, the cue block succession counter is reset at step F5, and the mute block succession counter is incremented (+1) at step F6. A check is performed at step F7 to see whether the contents of the mute block succession counter is 5 or more. If 5 or more, operation proceeds to step F8 where the cue waiting state flag is set, further proceeding to step F23. If less than 5, operation proceeds to step F23 directly. At step F23, operation is suppressed until the elapse of 5 msec of the timer. Then, operation returns to step G.

That is to say, a cue waiting state flag is set if 5 blocks or more determined as a mute block continues, whereby the state to determine the cue signal of the next block is attained.

If the determination result of step F4 shows a cue block, step F9 is executed where the mute succession counter is reset. The cue waiting state flag is checked in step F10. If there is no cue waiting state, operation returns to step G upon expiration of the 5 msec timer. If at a cue waiting state, operation proceeds to step F11, where the value of the cue block succession counter is checked whether it is 0 or not.

If the value of the cue block succession counter is 0, there is a possibility that a cue signal is detected for the first time. Therefore, the type of this cue signal is stored, and the cue block succession counter is set to 1 (steps F12, F13). Then the operations of steps F23 and et seq are executed. That is to say, because there is possibility that the current block is a cue signal block after a mute period continuing for a predetermined period, the cue block succession counter is set to 1, preparing to check whether the same cue block continues or not.

If the content of the cue block succession counter is not 0 according to the determination in step F11, the type of the cue signal is checked whether it is identical to that of the cue signal of the immediately preceding block (step F14). If it is not the same type, it is considered that it is not the correct cue signal. The cue block succession counter and the cue waiting state flag are reset at step F20, and operation returns to step G.

If the result of the check in step F14 is YES, i.e., if the current block and the last block are of the same cue signal, the cue block succession counter is incremented (step F15). Operation then proceeds to step F16 where the content of the cue block succession counter is checked to see if it is 6 or more. If it is less than 6, operation proceeds to step F23. If 6 or more, a cue detection signal is output (step F17). Each of the counters and the flag are reset at step F19, and operation returns to step G.

Thus, determination is made of the detection of a cue signal when there are 5 or more mute blocks in succession, followed by 6 or more cue signal blocks of the same type in succession.

FIG. 11 is a flow chart for explaining in details the data collecting step G of FIG. 10. To gather data, the L level point counter, the wave number counter, and the period counter in RAM 37 are reset at step G1 to clear the period number distribution table (provided within RAM 37) for initialization.

Next, a timer of 52 $\mu$sec (a soft timer incorporated in CPU 33) is set (step G2). The output of comparator 32 is fetched from input port 34 (step G3) and the period counter is incremented (+1) at the next step G4. At step G5, the current sample value is checked whether it is a L level or not. If a L level, the L level point counter is incremented at step G6. If not a L level, a operation directly proceeds to step G7.

A check is performed whether the previous sample value is at a H level and the current sample value is at a L level in step G7, to branch the operation. If this condition is satisfied, the level of the applied signal has changed, that is to say, the continuing H level period has ended. Then the wave number counter is incremented at step G8, whereby the current content of the period counter is recorded in the period number distribution table at step G9. The period number distribution table has a structure that comprises a plurality of counter areas corresponding to each count value of the period counter. That is to say, if the count value of the period counter is k at this time, the counter area corresponding to k in the period number distribution table is incremented. Then, the period counter is reset (step G10), and operation proceeds to step G11.

If the condition of the previous sample value being a H level and the current sample value being a L level is not satisfied by the determination in step G7, operation proceeds directly to step G11.

At step G11, check is made as to whether sampling of 1 block (approximately 95 msec) has ended or not. If not, operation proceeds to step G12 for the next sampling. At step G12, the state of the 52 $\mu$sec timer is checked and waits until it ends. If it ends, operation returns to step G2. If determination is made that sampling of 95 msec has ended at step G11, the collecting operation of data is terminated and returns to step F3 of FIG. 10. That is to say, in the data collecting step G, the output of comparator 32 is sampled by every 52 $\mu$sec (a period of 19.2 Khz) for checking the state of that level, whereby the sampling number during fall to fall is recorded in the period counter, the sampling number during the L level period is recorded in the L level point counter, and the number of changes from H level to L level is recorded in the wave number counter, respectively, to store the plural period number distribution of one block in the number distribution table.

FIGS. 12 and 13 are flow charts showing step H in detail in FIG. 10 where the type of the flag is determined. Although FIGS. 12 and 13 show a serial operation, the operation is divided into two figures for convenience of illustration.

At step H shown in FIGS. 12 and 13, determination is made whether the current block is a user cue, an ending cue, a starting cue, a mute period, or none of these. To make this determination, the results of the aforementioned data collect step G are utilized.

In FIGS. 12 and 13, steps H1 to H6 are steps to determine a user cue signal, steps H7 to H12 are steps to determine an ending cue signal, steps H13 to H18 are steps to determine a starting cue signal, and steps H19 to H21 are steps to determine the mute block period.

Because steps H1-H6, H7-H12, H13-H18 carry out substantially the same operation, the operation of steps H1-H6 will be described in detail, while the other steps will be described briefly. Because the sampling period is 52 $\mu$sec, the sampling points in one block are:

$$95 \text{ msec}/52 \text{ }\mu\text{sec} \approx 1827$$

to result in 1827 points.

Because the frequency of a user cue signal is 2400 Hz, the user cue signal is equivalent to 8 sampling points. Therefore, if the signal reproduced by fixed magnetic head 1 is a user cue signal, the wave number between blocks is precisely:

$$1827/8 \approx 228$$

However, there is some allowance in step H1, where a check is made as to whether the wave number is 70% or more of this value.

At the next step H2, a check is performed whether the sampling points of in the range of 7 to 9 representing the period in the period distribution occupies 95% or more of the entire wave number. Furthermore, a check is performed whether the number of waves of sampling points 8 representing the period is 60% or more of the entire wave number in step H3, whether the number of waves of sampling points 7 representing the period is 30% or less than the entire wave number in step H4, and whether the number of waves of sampling points 9 representing the period is 30% or less then the entire wave number in step H5, respectively.

If the checks from steps H1 to H5 are all detected to be OK, determination is made that a user cue signal has been applied (step H6). The operation then returns to step F4.

The correct period in the case of an ending cue signal is 12. Although there is a slight difference, the steps from H7 to H12 are basically similar to those in the case of a user cue. The threshold value of the wave number used in determination slightly differs. This is because the frequency in the case of an ending cue signal is higher than that of a user cue signal, whereby the difference in frequency when the number of sampling points differ by 1 is smaller. For example, in the case of an ending cue signal, the frequency is 1.75 kHz if the sampling points are 11, and the frequency is 1.48 kHz if the sampling points are 13.

Because the frequency of a starting cue signal is further higher, the conditions differ. That is to say, with respect to the correct period of 24, checks are made whether the sampling points of in the range of 21 to 27 representing the period is 95% or more of the entire wave number in step H14, whether the number of waves of sampling points 23, 24 and 25 representing the period is 60% or more of the entire wave number in step H15, whether the number of waves of sampling points 21, 22 representing the period is 30% or less than the entire wave number in step H16, whether the number of waves of sampling points 26, 27 representing the period is 30% or less than the entire wave number in step H17.

When determination is made that the current block is neither of the above mentioned cue signals, the L level or the H level states are checked in steps H19, H20 to see if they occupy 95% or more of the entire period. A mute state is considered as to be fixed to either level because comparator 32 has hysterisis. If the condition matches either step H19 or H20, determination is made that it is a mute period.

When neither of the condition of steps H19, H20 match, determination is made that it is neither a cue signal or a mute period.

Although an audio signal for monitoring PCM audio track 23 is recorded in auxiliary audio track 24 in the above mentioned embodiment, the audio signal recorded in this auxiliary audio track 24 may be other audio signals. For example, when the audio to be recorded is recorded on PCM audio track 23 in the case of stereo voice, and recorded on auxiliary audio track 24 in the case of monaural voice, not the auxiliary audio signal, but the monaural main audio signal is recorded on the auxiliary audio track.

Industrial Applicability

Thus, the present invention can be applied widely to magnetic recording/reproduction devices using a magnetic tape as the recording medium.

We claim:

1. In a system for recording and reproducing signals to/from a magnetic tape, wherein said system has a magnetic tape pre-recorded with a main audio signal, a cue signal, a first signal and an auxiliary audio signal that is auxiliary to the main audio signal, the auxiliary audio signal and cue signal being in a same audio frequency band and are time division multiplex recorded onto an audio track on said magnetic tape, wherein the first signal is recorded on a track different from the audio track and is used by the system to control the system, apparatus for detecting the cue signal by reproducing a signal from said audio track, said apparatus comprising:

means for reproducing said first signal to control said system during operation of the system in a reproduction mode, said first signal having a frequency proportional to a speed of the magnetic tape and being reproduced from a track different from the audio track of said magnetic tape;

means for detecting a wave number of the signal reproduced from said audio track, said wave number being detected during a predetermined time period defined by said first signal; and means for determining, in response to said wave number being within a predetermined range, that said signal reproduced from said audio track is said cue signal.

2. The apparatus of claim 1, wherein said first signal is a control signal which is reproduced from a control track on said magnetic tape.

3. The apparatus of claim 1, wherein said first signal is a clock signal which is reproduced from a time code track on said magnetic tape.

4. The apparatus according to claim 1, wherein said determining means determines that the signal reproduced from said audio track is said cue signal, when the wave number is within said predetermined range for a predetermined number of times in succession.

* * * * *